(12) United States Patent
Phaik

(10) Patent No.: US 7,562,328 B1
(45) Date of Patent: Jul. 14, 2009

(54) NAVIGATION TOOL FOR CONNECTORS

(75) Inventor: Chin Choi Phaik, Penang (MY)

(73) Assignee: Altera Corporation, San Jose, CA (US)

( * ) Notice: Subject to any disclaimer, the term of this patent is extended or adjusted under 35 U.S.C. 154(b) by 1000 days.

(21) Appl. No.: 11/036,928

(22) Filed: Jan. 14, 2005

(51) Int. Cl.
*G06F 17/50* (2006.01)

(52) U.S. Cl. ...................................................... 716/11

(58) Field of Classification Search ............. 716/11–14; 345/418
See application file for complete search history.

(56) References Cited

U.S. PATENT DOCUMENTS

| | | | | |
|---|---|---|---|---|
| 4,635,208 | A * | 1/1987 | Coleby et al. ................ | 716/11 |
| 4,970,664 | A * | 11/1990 | Kaiser et al. ................ | 715/804 |
| 5,164,911 | A * | 11/1992 | Juran et al. ................. | 716/11 |
| 6,708,321 | B2 * | 3/2004 | Wheeler et al. .............. | 716/18 |
| 6,711,729 | B1 * | 3/2004 | McElvain et al. ............ | 716/18 |
| 7,003,751 | B1 * | 2/2006 | Stroomer et al. ............ | 716/11 |
| 7,013,028 | B2 * | 3/2006 | Gont et al. .................. | 382/113 |
| 7,231,623 | B2 * | 6/2007 | Miller ......................... | 716/11 |
| 7,240,301 | B2 * | 7/2007 | Benayoun et al. ............ | 716/1 |
| 2002/0046386 | A1 * | 4/2002 | Skoll et al. .................. | 716/1 |
| 2003/0084409 | A1 * | 5/2003 | Abt et al. .................... | 716/1 |
| 2004/0268283 | A1 * | 12/2004 | Perry et al. .................. | 716/11 |
| 2005/0188339 | A1 * | 8/2005 | Anderson .................... | 716/11 |
| 2005/0278670 | A1 * | 12/2005 | Brooks et al. ................ | 716/5 |
| 2006/0101368 | A1 * | 5/2006 | Kesarwani et al. .......... | 716/11 |

OTHER PUBLICATIONS

Shiran, Yehuda, "A deterministic approach to netlist display", 1989, IEEE. pp. 1-4.*

* cited by examiner

*Primary Examiner*—Stacy A Whitmore
(74) *Attorney, Agent, or Firm*—Martine Penilla & Gencarella, LLP

(57) ABSTRACT

A method for creating a tool for enhancing navigation through a schematic display of a netlist is provided. In the method, the display of the netlist is partitioned into multiple pages. A vector is inserted into one of the partitioned pages and then a marker is inserted into the vector. Whether a node of the netlist is a source node or a destination node is determined. Based on whether the node is a source or a destination node, a page reference is inserted before or after the dummy page. In one embodiment, the method is incorporated as program instructions on a computer readable medium. A computer implemented system and a graphical user interface for navigating through a register transfer level display of an integrated circuit are also provided.

20 Claims, 8 Drawing Sheets

NAVIGATION TOOL FOR CONNECTORS

BACKGROUND

1. Field of the Invention

This invention relates generally to integrated circuit design and, in particular, to a technique for viewing a Register Transfer Level (RTL) graphical representation of an initial design synthesis.

2. Description of the Related Art

For the design of digital circuits on the scale of VLSI (Very Large Scale Integration) technology, designers often employ computer-aided techniques. Standard languages known as Hardware Description Languages (HDLs), have been developed to describe digital circuits, to aid in the design and simulation of complex digital circuits. Several hardware description languages, such as VHDL and Verilog, have evolved as industry standards. VHDL and Verilog are general-purpose hardware description languages that allow definition of a hardware model at the gate level, the RTL, or the behavioral level using abstract data types. As device technology continues to advance, various product design tools have been developed to adapt HDLs for use with newer devices and design styles.

In designing circuits using HDL compilers, designers first describe circuit elements in HDL source code and then compile the source code to produce synthesized RTL netlists. The RTL netlists correspond to schematic representations of the circuit elements. The circuits containing the synthesized circuit elements may or may not be optimized to improve timing relationships and eliminate unnecessary or redundant logic elements. Such optimization typically involves substituting different gate types or combining and eliminating gates in the circuit, and often results in re-ordering the hierarchies and relationships between the original RTL objects and the underlying source code that produced the RTL objects.

The processing time to display the RTL view grows in line with the size of a circuit design, e.g., the total number of nodes and pins. To minimize the processing time, large circuit designs are often partitioned into smaller segments prior to display. Typically, RTL displays of large circuit designs will show only one of the multiple segments, thus avoiding long processing times for the RTL view display. However, the connections for the multiple segments must somehow be accessible to the designer when navigating between the segments. Currently, the automated viewers of existing tools do not differentiate between related pages. Thus, the related page list cannot be differentiated between the source page and other destination pages. Without this differentiation between the source pages and destination pages, it makes navigating difficult when the user wants to view solely the source nodes or the destination nodes.

As a result, there is a need to solve the problems of the prior art to differentiate between related pages in order for a designer to quickly navigate to a desired source or destination.

SUMMARY

Broadly speaking, the present invention fills these needs by providing a method and apparatus for easily navigating to a related source node page or a destination node page. It should be appreciated that the present invention can be implemented in numerous ways, including as a method, a system, or a computer readable medium. Several inventive embodiments of the present invention are described below.

In one aspect of the invention, a method for enhancing navigation through a schematic display of a netlist is provided. In the method, the schematic display of the netlist is partitioned into multiple pages. A vector is inserted into one of the partitioned pages and then a marker in the form of a dummy page is inserted into the vector. It is then determined if a node of the netlist is either a source node or a destination node. Based on whether the node is a source node or a destination node, a page reference is inserted before or after the dummy page. Thus, when a designer right clicks over the node, a pop menu, defined by the vector, will appear providing location data for a destination driven by the source node or a source for the destination node. In one embodiment, the method is incorporated as program instructions on a computer readable medium.

In another aspect of the invention, a computer-implemented system for viewing an integrated circuit design is provided. The computer-implemented system includes a bus, a memory, and a display configured to present the integrated circuit design. The system further includes a processor in communication with the memory and the display over the bus. The processor receives an input command, which triggers a list of partitioned pages having connectors associated with the connector of the current partitioned page. The list of partitioned pages is organized according to whether the connector acts as a source or the connector acts as a destination for the element.

In still another aspect of the invention, a graphical user interface (GUI) is provided. The GUI includes two regions. The first region displays a partitioned page of a circuit design. This partitioned page will have connectors to a different partitioned page of the circuit design. The second region is triggered to display within the first region, e.g., a pop-up menu. In one embodiment, an input command executed over a region proximate to one of the connectors, triggers the second region to display. The second region displays connection information of related pages associated with the connector. In one embodiment, the connection information is categorized according to whether the connector is either a source node or a destination node.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 7B-1 is an enlarged portion of FIG. 7B illustrating a pop-up window in accordance with one embodiment of the invention.

FIG. 7C-1 is an enlarged portion of FIG. 7C illustrating a pop-up window in accordance with one embodiment of the invention.

DETAILED DESCRIPTION

An invention is described for a system and method for navigating through a register transfer level (RTL) graphical representation of a circuit design. It will be obvious, however, to one skilled in the art, that the present invention may be practiced without some or all of these specific details. In other instances, well known process operations have not been described in detail in order not to unnecessarily obscure the present invention.

A navigation tool for identifying connected components on separate pages of a partitioned circuit design is provided. The embodiments described below enable the differentiation of the partitioned pages by classifying the connected components as source or destination nodes. Connectors are then used to connect the components. There are two types of connectors, an Input-connector and an Output-connector. The Input-connector and the Output-connector are created to substitute for the missing source nodes and destination nodes, respectively. For a view page without the source node, but with destination nodes, an Input-connector represents the source node, and will drive the destination nodes. In a view page with the source node, but without destination nodes, the Output-connector represents the destination node, and will be driven by the source node.

Figure 1:
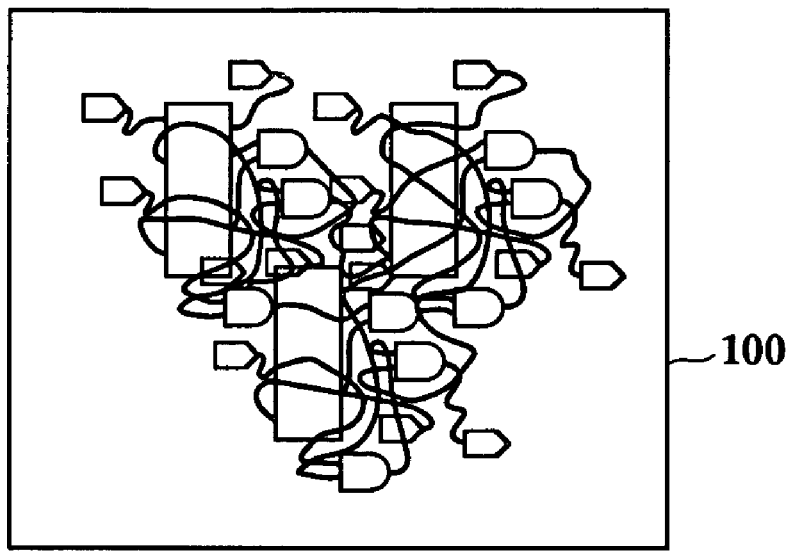
FIG. 1 is a high level simplified schematic diagram of a synthesized netlist.

FIG. 1 is a high level simplified schematic diagram of a synthesized netlist. Diagram 100 illustrates the multiple connections between the functional elements of a netlist for an integrated circuit design. Here, the connections between the functional elements of the netlist are not easily deciphered because of the density and numerous connections. As used herein, a functional element, also referred to as a logic cell, may be any suitable single or multiple block of logic, e.g., a register, a look up table, combinatorial logic, a logical array block, a logical element, an adaptive logic module (ALM), digital signal processor (DSP) blocks, trimatrix embedded memory blocks, such as M512, random access memory, M4K RAM, and MRAM, or any combination thereof, etc. In one embodiment, a functional element includes any technology independent gate, e.g., AND, OR, XOR gates, multiplexors, latches, flip flops, etc. In essence, a functional element may be any lower level logic block employed in an integrated circuit design.

Figure 2:
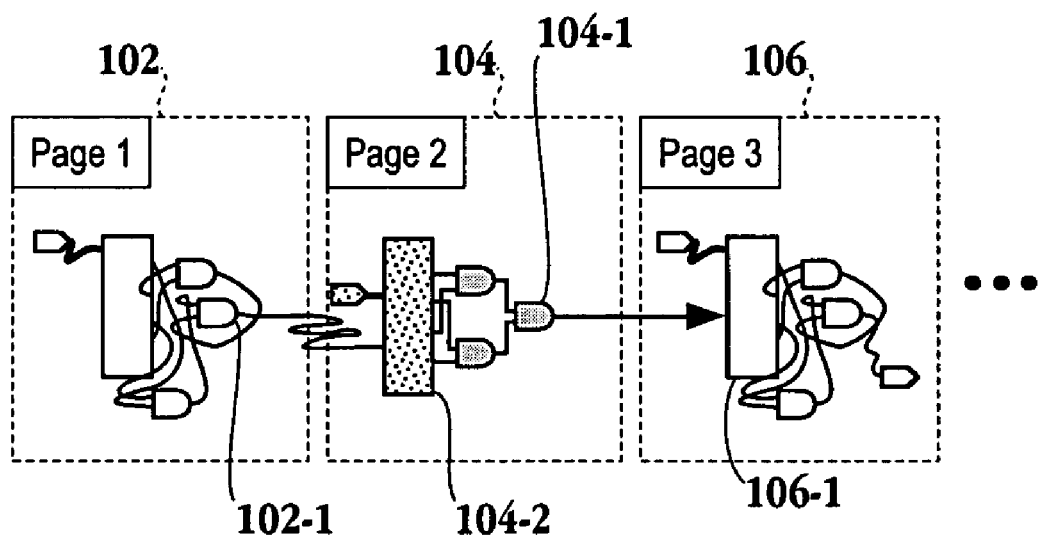
FIG. 2 is a partition view of the synthesized netlist of FIG. 1.

FIG. 2 is a partition view of the synthesized netlist of FIG. 1. Successive pages are used in order to illustrate the connections within the original netlist in an orderly manner. Page 1-102, page 2-104, page 3-106, etc., include subsets of functional elements from the synthesized netlist of diagram 100 of FIG. 1 for viewing purposes. The multiple segments or pages of FIG. 2 are interconnected and will therefore need to show connection types between the pages. As illustrated in FIG. 2, functional element 102-1 and functional element 104-1 need to be connected to an output connector that represents a destination node from a separate page, which is driven by functional elements 102-1 and 104-1. It should be appreciated that after partitioning, connected components (source and destination nodes), which are partitioned into their different pages, will be connected through either an input connector or an output connector. As mentioned above, the input-connector and output-connector are created to substitute for the missing source and destination nodes, respectively. Accordingly, functional elements 104-2 and 106-1 are in need of an input connector to represent the source nodes driving elements 104-2 and 106-1.

Figure 3:
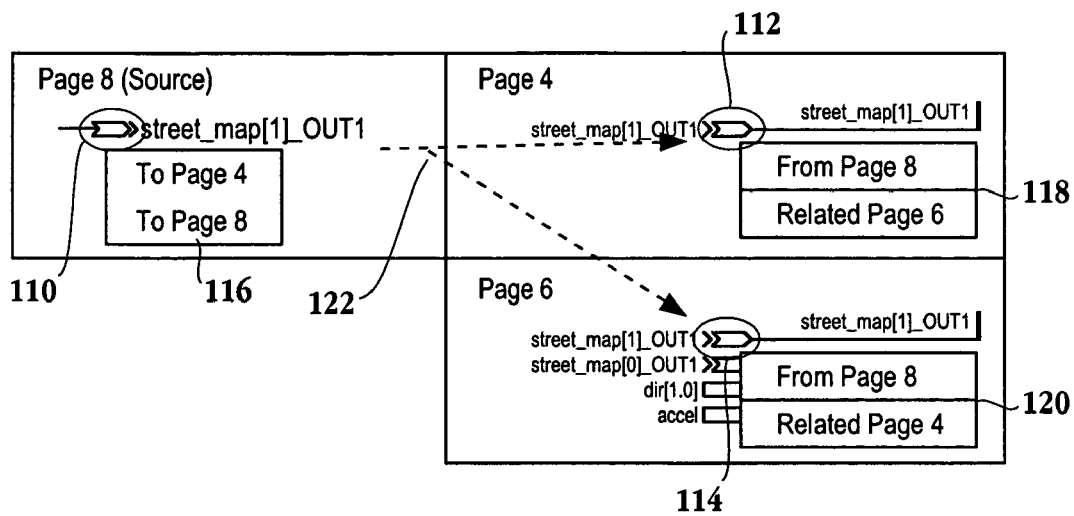
FIG. 3 further exemplifies the partitioned page concept that facilitates navigation through the input and output connectors in accordance with one embodiment of the invention.

FIG. 3 further exemplifies the partitioned page concept that facilitates navigation through the input and output connectors in accordance with one embodiment of the invention. In FIG. 3 a source node and two destination nodes are illustrated. Source node 110 of page 8 drives destination nodes 112 and 114, of pages 4 and 6, respectively. To facilitate the navigation between the multiple view pages, a user may perform a right click on one of the connectors, i.e., 110, 112 or 114, or in a proximate region to one of the connectors, to generate a pop-up which will list the related pages. For example, source node 110 drives the two destination nodes, 112 and 114. Page eight does not have a destination node as a result of the partitioning. Therefore, the missing destination nodes are substituted by output connector 110, and are driven by the source node of page eight. On page four, the source node is missing. Input connector 112 substitutes for the missing source node and thus, the destination node of page four is driven by the substituted source node, which is located on page eight. Similarly, page six has the source node missing. The source node is substituted by input connector 114, which drives the corresponding destination node.

Still referring to FIG. 3, connection line 122 is illustrated for exemplary purposes. It should be appreciated that connection line 122 is not actually visible due to the partitioning of the netlist. However, pop-up menus 116, 118, and 120 provide the connection information represented by connection line 122. In one embodiment, a user may right click while a cursor is proximate to connectors 110, 112, or 114, to view corresponding pop-up menus 116, 118, or 120. Thus, with reference to page eight of FIG. 3, pop-up menu 116 provides information that the destination nodes driven by the source node of page eight are located on pages four and six. With reference to page four of FIG. 3, pop-up menu 118 indicates that the destination node of page four is driven by the source node of page eight and that the source node of page eight also drives a destination node of page six. Pop-up menu 120 of page six provides similar information to that of pop-up menu 118, with the exception that the related destination node is on page four. It should be appreciated that while the use of a right click is suggested to trigger the pop-up menu to appear, the embodiments are not limited to this type of input command. That is, any suitable input command may be used in place of the right click technique.

Figure 4:
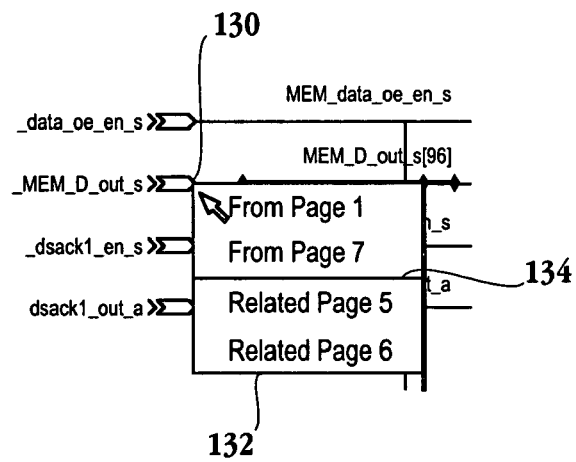
FIG. 4 is a simplified schematic diagram illustrating an input connector wherein the related pages are categorized into two categories in accordance with one embodiment of the invention.

FIG. 4 is a simplified schematic diagram illustrating an input connector wherein the related pages are categorized into two categories in accordance with one embodiment of the invention. The two major categories are illustrated in pop-up window 132, which is associated with input connector 130. The first category is associated with a source page. Here, the descriptors "From Page 1" and "From Page 7" of pop-up window 132 contain links to a source node represented by input connector 130 of the current page. Thus, selecting "From Page 1" of pop-up menu 132 will display page one, which contains the source node associated with input connector 130. Pop-up menu 132 also includes information as to pages containing additional destination nodes associated with the source of input connector 130. That is, "Related Page 5" and "Related Page 6" entries of pop-up window 132 indicate the location of additional destination nodes. Selecting "Related Page 5" from pop-up window 132 will in page five being displayed, wherein other destination nodes are located that are also driven by the source node that drives input connector 130. Separator bar 134 is used to visibly separate the source pages from other destination node pages.

Figure 5:
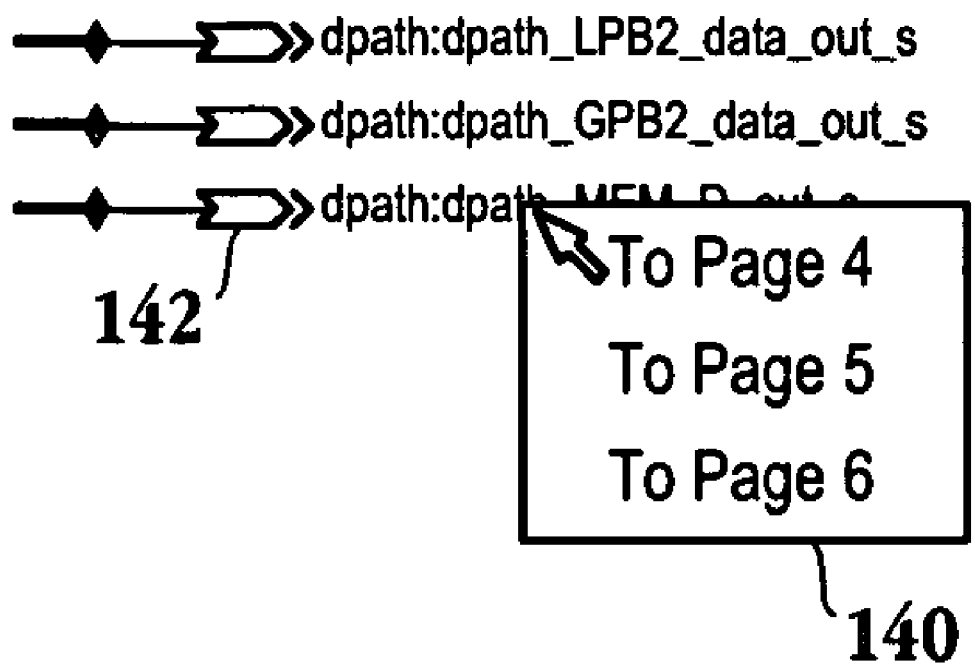
FIG. 5 is a simplified schematic diagram illustrating the use of an output connector to differentiate pages by source or destination nodes in accordance with one embodiment of the invention.

FIG. 5 is a simplified schematic diagram illustrating the use of an output connector to differentiate pages by source or destination nodes in accordance with one embodiment of the invention. Output connector 142 is associated with pop-up window 140. Selecting "To Page 4," "To Page 5," or "To Page 6," links of pop-up window 140 will display the corresponding page that contains destination nodes driven by output connector 142. That is, the destination pages represented by pop-up window 140 contain destination nodes driven by the source of the page corresponding to output connector 142. Thus, a user may conveniently navigate partitioned pages of a netlist by the embodiments described herein. It should be appreciated that the link entries in the pop-up windows discussed herein may be selected through a suitable input command, such as a mouse click, stylus input on a touch screen, etc.

Tables 1 and 2 illustrate the separation feature incorporated into the pop-up windows of the above-described figures, e.g., separator bar 134 of FIG. 4. In order to support this separation, a dummy page concept is used. A page containing a source node is inserted before a dummy page, and a page containing destination nodes are appended after the dummy page, in accordance with one embodiment of the invention. Table 1 illustrates a dummy page separating source pages from destination pages for an input connector. Table 2 illustrates a dummy page in which destination pages are appended thereafter for an output connector. It should be appreciated that while Table 1 and 2 illustrate certain positions for source pages and destination pages, these positions may be reversed as the positions listed in Tables 1 and 2 are not meant to be limiting. That is, the important concept is for the separation of the source page and the destination pages and not necessarily their corresponding positions.

TABLE 1

| Page Number List | Description | At Pop-up Menu |
|---|---|---|
| 1 | Insert source page at front, before dummy page | From Page 1 |
| 7 | Insert source page at front, before dummy page | From Page 7 |
| −1 | Dummy page to separate source and destination pages | Separator |
| 4 | Append other destination pages at end, after dummy page | Related Page 4 |
| 5 | Append other destination pages at end, after dummy page | Related Page 5 |

TABLE 2

| Page Number List | Description | At Pop-up Menu |
|---|---|---|
| −1 | Dummy page to separate source and destination pages | Nothing |
| 4 | Append other destination pages at end, after dummy page | To Page 4 |

TABLE 2-continued

| Page Number List | Description | At Pop-up Menu |
|---|---|---|
| 5 | Append other destination pages at end, after dummy page | To Page 5 |
| 6 | Append other destination pages at end, after dummy page | To Page 6 |

Figure 6:
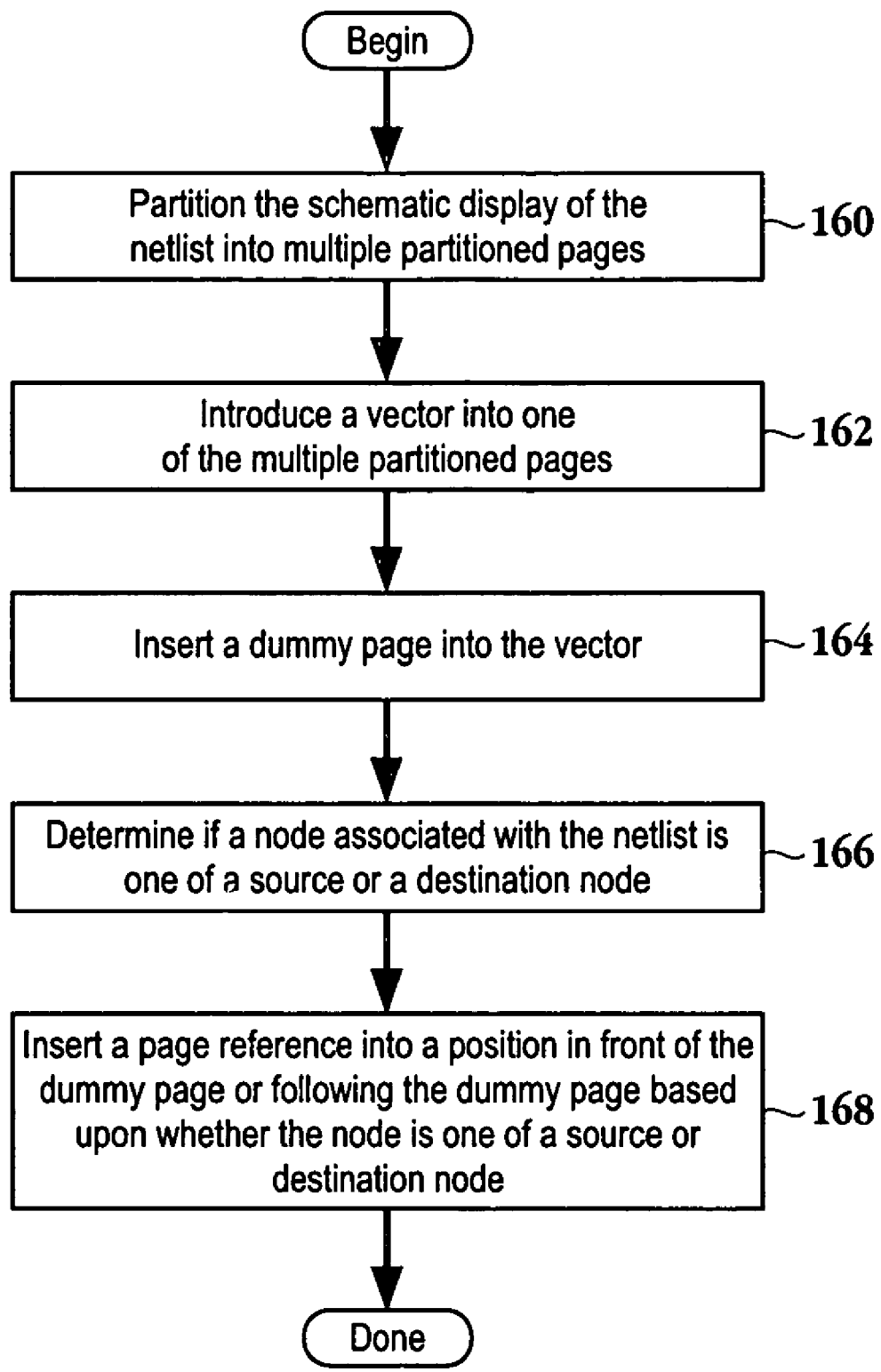
FIG. 6 is a flow chart diagram illustrating a method for creating a tool for navigating through a schematic display of a netlist in accordance with one embodiment of the invention.

FIG. 6 is a flow chart diagram illustrating a method for creating a tool for navigating through a schematic display of a netlist in accordance with one embodiment of the invention. The method initiates with operation 160 where the schematic display of the netlist is partitioned into multiple pages. For example, the partitioning arrangement illustrated in FIG. 2 may be used to organize a synthesized netlist. The method then advances to operation 162 where a vector is introduced into one of the multiple partitioned pages. A dummy page is then inserted into the vector in operation 164. The dummy page will act as a separation border between source and destination pages later introduced into the vector as described below. In one embodiment, the dummy page represents a separator bar as illustrated with reference to FIG. 4. The method then proceeds to operation 166 where it is determined if a node associated with the netlist is one of a source node or a destination node. One exemplary technique to make this determination is to check the source or the destination of the node and determine whether or not the corresponding source or destination is within the same page. In operation 168, if the corresponding source or destination of the node is not within the same page, then for a source of the node, the source page is inserted in front of the vector. That is, the source page is inserted ahead of the dummy page. In the case of a destination for the node, the destination page is appended at the back of the vector. Therefore, the destination page will be inserted after the dummy page.

In one embodiment, when creating the pop-up menus described herein, all pages before the dummy page are known as pages containing source nodes. In one exemplary technique, there are two different ways to display the dummy page and destination pages of the pop-up menu. If there is source page, the dummy page will be represented as a separator and the destination pages are named as "Related Page X". On the other hand, if there is no source page, the dummy page is not represented in pop-up menu, and the destination pages are named as "To Page X".

The pseudo-code illustrated in Table 3 exemplifies the functionality embodied in FIG. 6.

TABLE 3

Figure 7A:
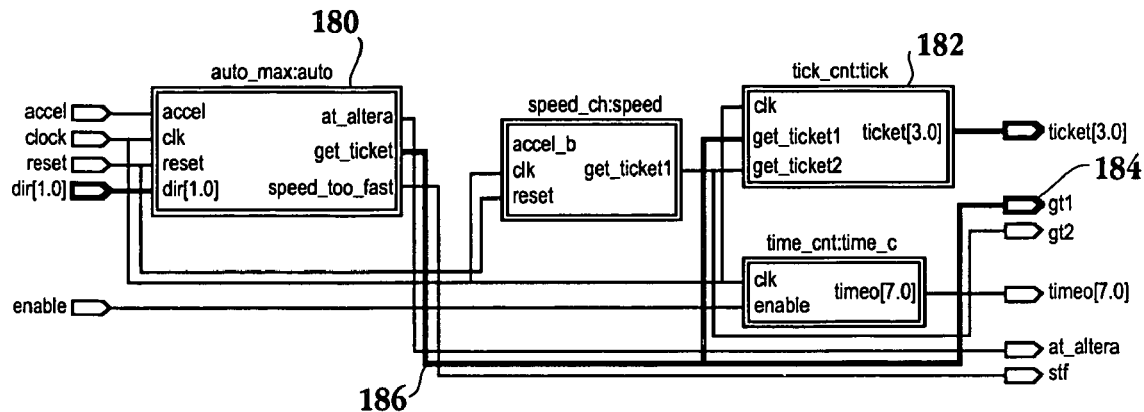
FIG. 7A is an exemplary circuit design prior to being partitioned in accordance with one embodiment of the invention.
Figure 7B:
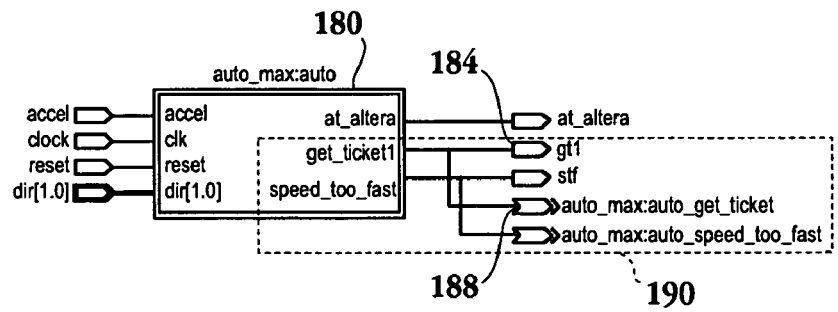
FIGS. 7B and 7C are partitioned pages of FIG. 7A.
Figures 1, 7B:
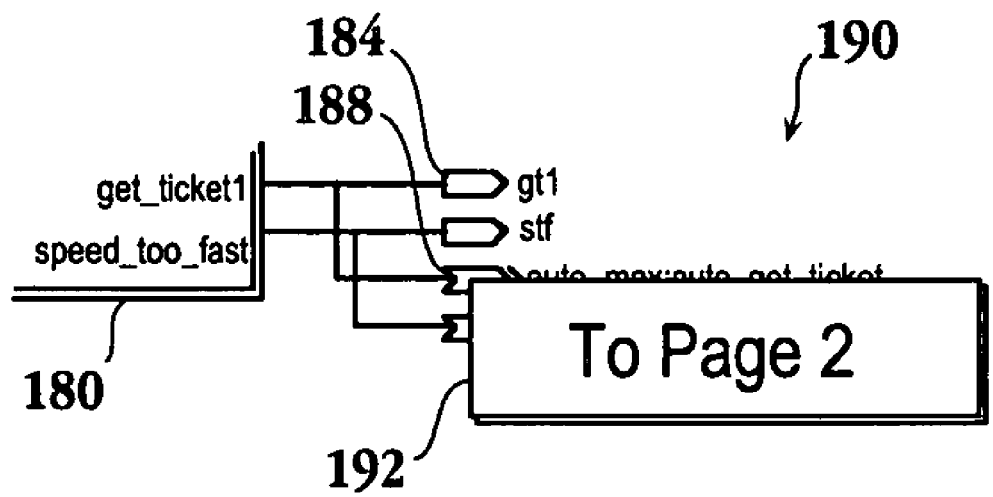
Figure 7C:
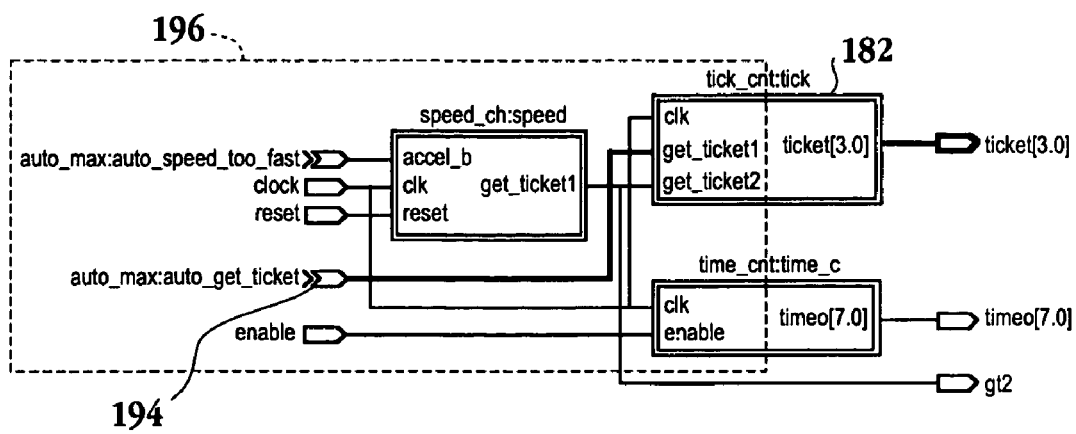
Figures 1, 7C:
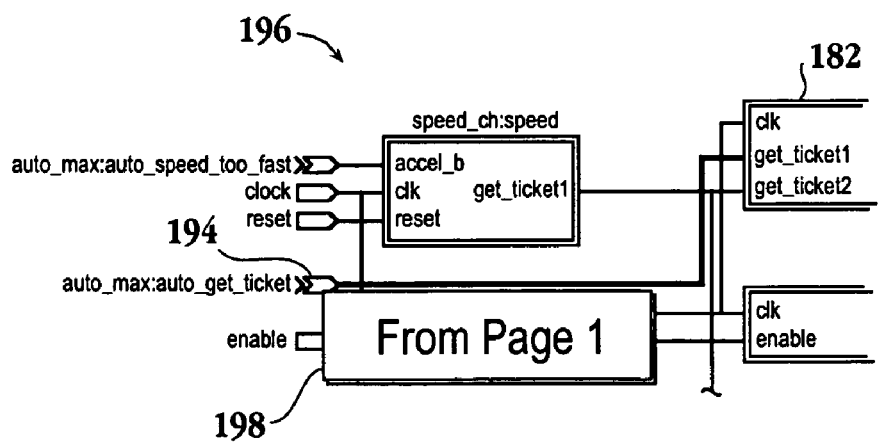

For each partitioned page
  Create a vector, and insert a 'dummy page' into the vector
  For each node in the page
    Check if the source of the node is within the same page as the node
      If 'yes'
        Do nothing
      Else
        Insert the source page into the front of vector (before 'dummy page')
    For each destination of the node
      Check if the destination node is within the same page as the node
        If 'yes'
          Do nothing
        Else
          Append the destination page at the back of the vector (after 'dummy page), FIG. 7A is an exemplary circuit design prior to being partitioned in accordance with one embodiment of the invention. As illustrated in FIG. 7A through line 186, auto_max: auto block 180 is the source node that drives tick_cnt:tick node 182 and gt1 pin 184. Accordingly, tick_cnt:tick node 182 and gt1 pin 184 are the destination nodes. However after a partitioning process is performed on the design of FIG. 7A, two pages result as depicted in FIGS. 7B and 7C. FIG. 7B illustrates a first partitioned page where auto_max:auto block 180 and gt1 pin 184 are within the same page. However, tick_cnt:tick node 182 is located on a different page than auto_max:auto block 180 and gt1 pin 184, as illustrated in FIG. 7C. It should be appreciated that since auto_max:auto block 180 and gt1 pin 184 are within the same page, no connectors are needed. However, FIG. 7B doesn't contain tick_cnt:tick node 182, therefore, tick_cnt:tick node 182 is replaced with an output connector 188, and auto_max:auto block 180 drives output connector 188. FIG. 7B-1 illustrates region 190 of FIG. 7B, where responsive to an input command proximate to output connector 180, pop-up menu 192 indicates that the destination node, i.e., tick_cnt:tick node 182, is located at Page 2.

FIG. 7C illustrates a second partitioned page where auto_max:auto block 180 is replaced with input connector 194, and tick_cnt:tick node 182 is driven by input connector 194. FIG. 7C-1 is an expanded view of region 196 of FIG. 7C, where responsive to an input command proximate to input connector 194, pop-up menu 198 indicates that the source node, i.e., auto_max:auto block 180, is located at Page 1. It should be appreciated that for input connector 194, if the source node, i.e., auto_max:auto block 180, has other destination nodes, which are not located in either Page 1 or Page 2, then, these other destination nodes will show as "Related Page X", separated by a separator bar, as illustrated with reference to FIGS. 3 and 4.

Figure 8:
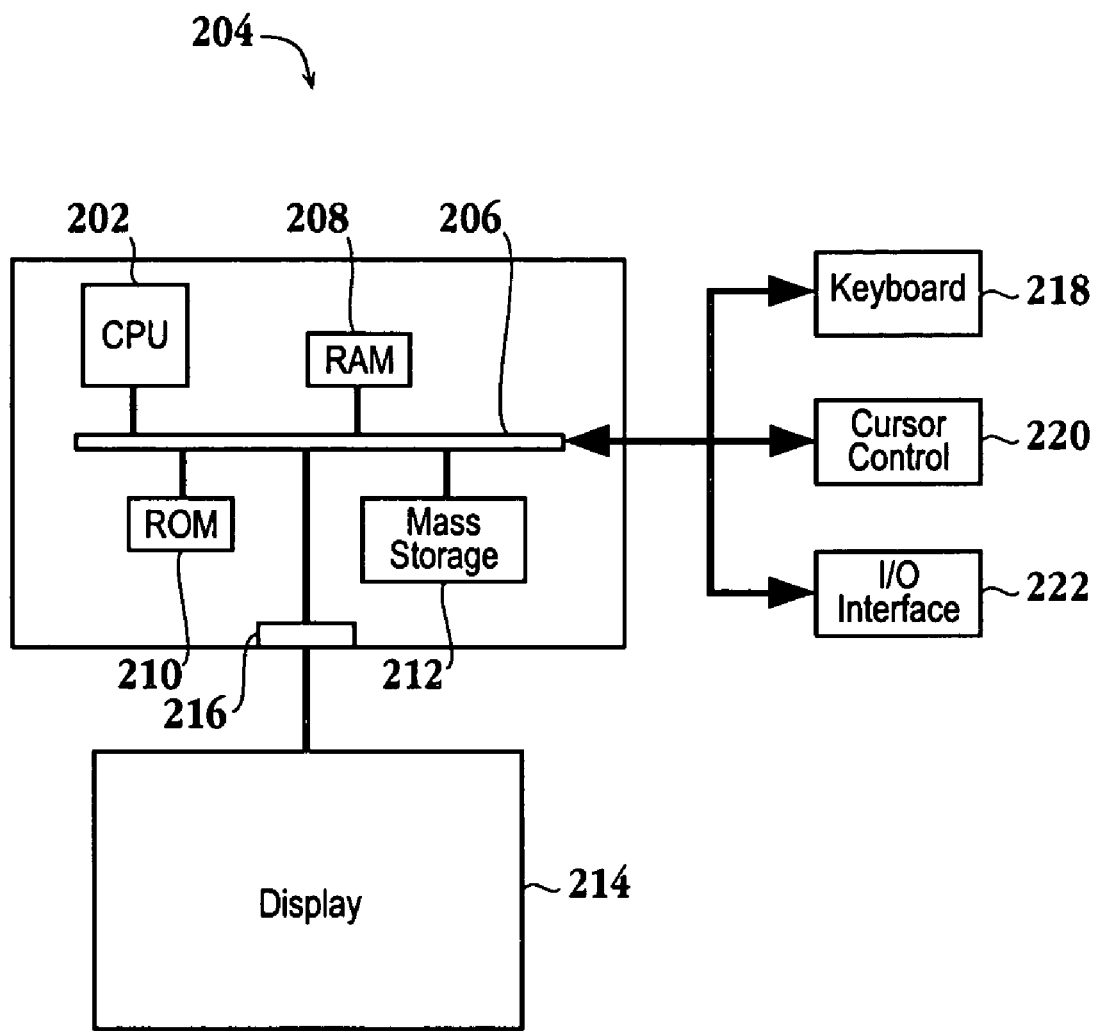
FIG. 8 is a simplified schematic diagram of a system, which may implement embodiments of the present invention.

FIG. 8 is a simplified schematic diagram of a system, which may implement embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 8 may be used to perform synthesis of a design that is described in a hardware description language. The computer system 204 includes a central processing unit (CPU) 202, which is coupled through bus 206 to random access memory (RAM) 208, read-only memory (ROM) 210, and mass storage device 212. Mass storage device 212 represents a persistent data storage device such as a floppy disc drive or a fixed disc drive, which may be local or remote. It should be appreciated that CPU 202 may be embodied in a general-purpose processor, a special purpose processor, or a specially programmed logic device. Display 214 is in communication with CPU 202, RAM 208, ROM 210, and mass storage device 212, through bus 206 and display interface 216. Of course, display 214 is configured to display the user interfaces described herein. Keyboard 218, cursor control 220, and input/output interface 222 are coupled to bus 206 in order to communicate information in command selections to CPU 202. It should be appreciated that data to and from external devices may be communicated through input/output interface 222. CPU 202 would execute the functionality described herein to enable a designer to more efficiently navigate through partitioned pages of an RTL display in order to quickly locate source and destination nodes.

In summary, the above-described invention provides a method and system for optimizing navigation through an RTL view of an integrated circuit design. Through the use of input and output connectors providing a link between partitioned pages, a designer may efficiently locate related source and destination nodes of the design layout. In addition, the designer is able to quickly distinguish between a source node and a destination node through the user interfaces presented herein.

The integrated circuit design being optimized through the above-described embodiments may be incorporated into a programmable logic device. The programmable logic device may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. Additionally, the PLDs according to the present invention may be included in a processor that is part of an electronic system. The electronic system may be a digital computing system such as a general or special purpose computer, or a specialized digital switching network, or other processing system.

The invention can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for creating a tool for enhancing navigation through a schematic display of a netlist, the tool resident in a memory of a computer system and comprising method operations of:
    partitioning the schematic display of the netlist into multiple partitioned pages;
    introducing a vector into one of the multiple partitioned pages;
    inserting a dummy page into the vector;
    determining if a node associated with the netlist is one of a source or a destination node; and
    inserting a page reference into a position in front of the dummy page or following the dummy page based upon whether the node is one of a source or destination node.

2. The method of claim 1, wherein the node associated with the netlist is located on a different one of the multiple partitioned pages.

3. The method of claim 1, wherein the method operation of determining if a node associated with the netlist is one of a source or a destination node includes,
    verifying if the source for the node is located on a same partitioned page as the node; and
    verifying if the destination for the node is located on the same partitioned page.

4. The method of claim 1, wherein the method operation of partitioning the schematic display of the netlist into multiple partitioned pages includes,
    connecting components partitioned into different partitioned pages.

5. The method of claim 4, wherein the method operation of connecting components partitioned into different partitioned pages includes,
    substituting an input connector for a missing source node; and
    substituting an output connector for a missing destination node.

6. The method of claim 1, wherein the dummy page functions to separate source and destination pages.

7. A computer readable medium having program instructions for creating a tool for enhancing navigation through a schematic display of a netlist, comprising:
    program instructions for partitioning the schematic display of the netlist into multiple partitioned pages;
    program instructions for introducing a vector into one of the multiple partitioned pages;
    program instructions for inserting a dummy page into the vector;
    program instructions for determining if a node associated with the netlist is one of a source or a destination node; and
    program instructions for inserting a page into a position in front of the dummy page or following the dummy page based upon whether the node is one of a source or destination node.

8. The computer readable medium of claim 7, wherein the program instructions for determining if a node associated with the netlist is one of a source or a destination node includes,
    program instructions for verifying if the source for the node is located on a same partitioned page as the node; and
    program instructions for verifying if the destination for the node is located on the same partitioned page.

9. The computer readable medium of claim 7, wherein the program instructions for partitioning the schematic display of the netlist into multiple partitioned pages includes,
    program instructions for connecting components partitioned into different partitioned pages.

10. The computer readable medium of claim 9, wherein the program instructions for connecting components partitioned into different partitioned pages includes,
    program instructions for substituting an input connector for a missing source node; and
    program instructions for substituting an output connector for a missing destination node.

11. The computer readable medium of claim 7, further comprising:
    program instructions for triggering a pop-up menu from an input command received when a cursor is proximate to the node.

12. A computer implemented system for viewing an integrated circuit design, comprising:
    a bus;
    a memory;
    a display configured to present a partitioned page representing a portion of the integrated circuit design, the partitioned page including a connector associated with an element of another partitioned page;
    a processor in communication with the memory and the display over the bus, the processor operable to receive an input command associated with the connector, which triggers the processor to cause a list of partitioned pages having connectors associated with the connector to be displayed within the partitioned page, the list of partitioned pages incorporating a separation feature using a dummy page, the dummy page providing distinct separation of pages associated with source node and destination node for the connector, the list of partitioned pages being organized according to whether the connector acts as a source or the connector acts as a destination for the element.

13. The system of claim 12, wherein the system executes place and route program instructions in order to present a register transfer level graphical representation of the integrated circuit design.

14. The system of claim 12, wherein the instructions are stored in the memory.

15. A graphical user interface (GUI) embedded in a memory of a computer system for viewing an integrated circuit design, comprising:
    a first region displaying a partitioned page of a circuit design, the first region having connectors to another partitioned page of the circuit design, each of the connectors associated with a functional element of the circuit design; and
    a second region triggered to display within the first region through an input command executed over a connector region associated with one of the connectors, the second region displaying connection information of related pages associated with the one of the connectors, wherein the connection information is categorized according to whether the one of the connectors is one of a source node or a destination node, the second region incorporating a separation feature using a dummy page, the dummy page providing distinct separation of pages associated with source node and destination node, for the connector.

16. The GUI of claim 15, wherein the second region provides a visual separator between the connection information associated with the source node and the connection information associated with the destination node.

17. The GUI of claim 15, wherein the input command is a right click of a mouse.

18. The GUI of claim 15, wherein when the one of the connectors is a source node, the connection information will identify locations for corresponding destination nodes driven by the source node.

19. The GUI of claim 15, wherein when the one of the connectors is a destination node, the connection information will identify a location for a source driving the destination node.

20. The GUI of claim 19, wherein the connection information further includes additional destination nodes driven by the source.

* * * * *

UNITED STATES PATENT AND TRADEMARK OFFICE
CERTIFICATE OF CORRECTION

PATENT NO.         : 7,562,328 B1
APPLICATION NO. : 11/036928
DATED                : July 14, 2009
INVENTOR(S)      : Choi Phaik Chin It is certified that error appears in the above-identified patent and that said Letters Patent is hereby corrected as shown below:

Title Page, Item (75) Inventor should read

--Choi Phaik Chin--

Signed and Sealed this

Tenth Day of November, 2009

David J. Kappos
*Director of the United States Patent and Trademark Office*